Aug. 31, 1954  D. D. ACTON ET AL  2,687,575
INDICATING DEVICE
Filed Feb. 23, 1951
2 Sheets-Sheet 1
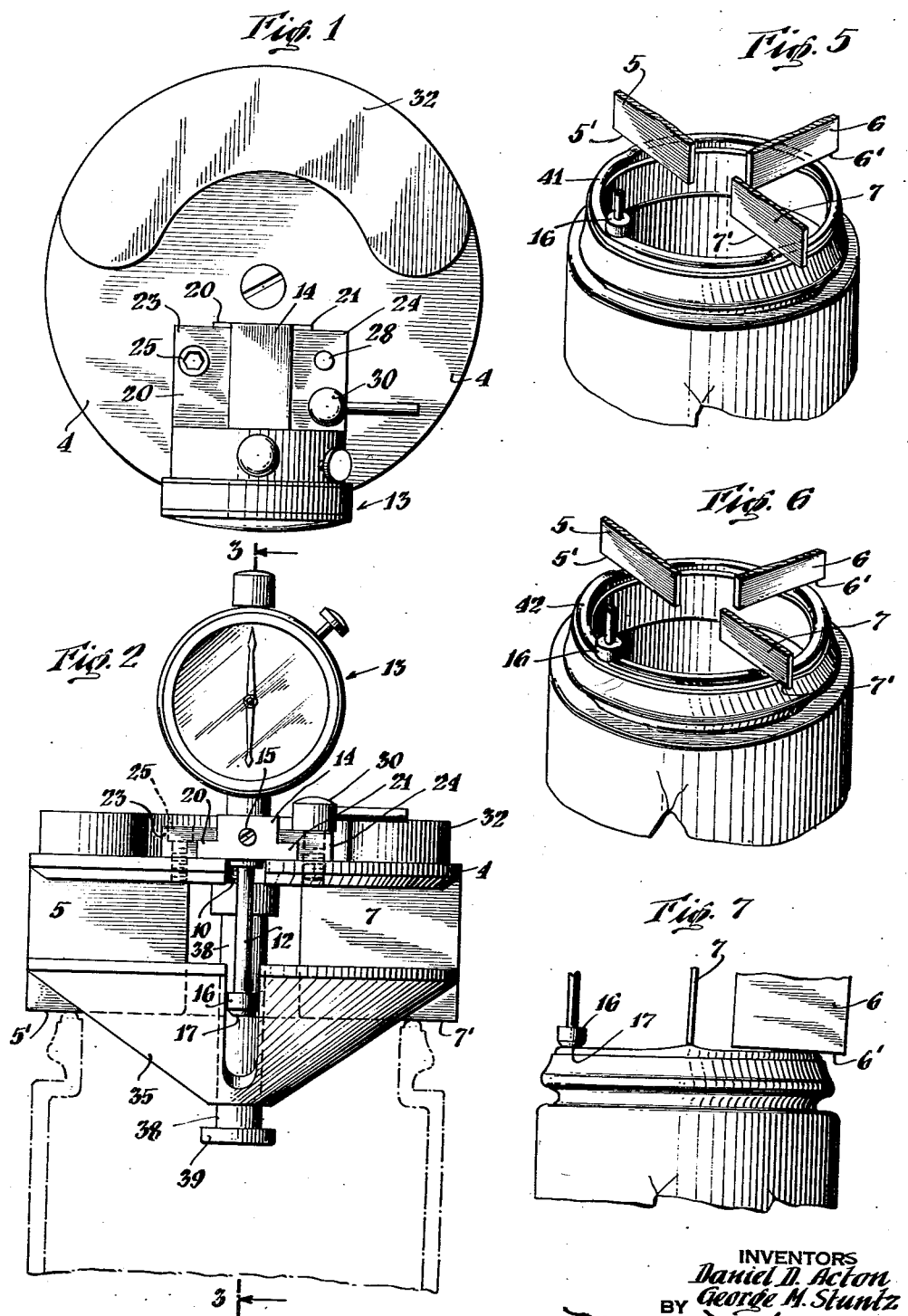
INVENTORS
Daniel D. Acton
George M. Stuntz
BY
Norman A. Holland
ATTORNEY Aug. 31, 1954

D. D. ACTON ET AL 2,687,575

INDICATING DEVICE

Filed Feb. 23, 1951

INVENTORS
Daniel D. Acton
BY George M. Stuntz
Norman Holland
ATTORNEY

Patented Aug. 31, 1954

2,687,575

UNITED STATES PATENT OFFICE 2,687,575

INDICATING DEVICE

Daniel D. Acton and George M. Stuntz, Lancaster, Ohio, assignors to Anchor Hocking Glass Corporation, Lancaster, Ohio, a corporation of Delaware Application February 23, 1951, Serial No. 212,292

11 Claims. (Cl. 33—172)

The present invention relates to measuring devices and more particularly to such a device for determining the extent of irregularities in the tops of glass containers.

With glass containers, such as wide mouth jars for foodstuffs and the like, it is desirable that the container sealing zone for receiving a closure cap conform as closely as possible to design specifications in order that a closure cap and its sealing gasket may form a secure hermetic or vacuum seal. In this connection it it desirable that all portions at the uppermost surface of the rim lie in the same plane; due to manufacturing difficulties, this is difficult to obtain and therefore tolerance limitations are established, the container being satisfactory if depressions or raised portions at its rim do not exceed the established limits. In order to determine whether the container is acceptable, it is necessary to test or measure appropriate portions of the container finish. When an inspection department and its equipment are close at hand this may be conveniently done, but without such facilities there are frequently differences of opinion as to whether or not the quality of the container finish is within acceptable tolerances.

The present invention aims to provide a relatively simple and compact device which may be used to determine whether irregularities from a true plane are present at the uppermost surface of a container rim, and to indicate the extent by which depressions or raised sections depart from a true plane.

An object of the invention is to provide an improved measuring or indicating device.

Another object of the invention is to provide an improved device of relatively simple construction and operation for indicating the quality of the uppermost surfaces of glass container.

A further object of the invention is to provide an improved measuring device which tends to center itself over the mouth of a container.

Still another object of the invention is to provide an improved measuring device which may be used with containers of different diameters.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a top plan view showing one form of the present invention;

Fig. 2 is a side elevational view showing the device illustrated in Fig. 1;

Fig. 5 is a diagrammatic view illustrating how the device of the present invention may be used to measure the extent of deviation from a plane of a low container rim portion;

Fig. 6 is a view similar to that of Fig. 5, but showing how the device may be used to measure the extent of deviation from a plane of a raised container rim portion; and Fig. 7 is a fragmentary side view illustrating the present device in use to measure variations in a container rim which has a pair of oppositely disposed high portions and a pair of oppositely disposed low portions.

Figure 3:
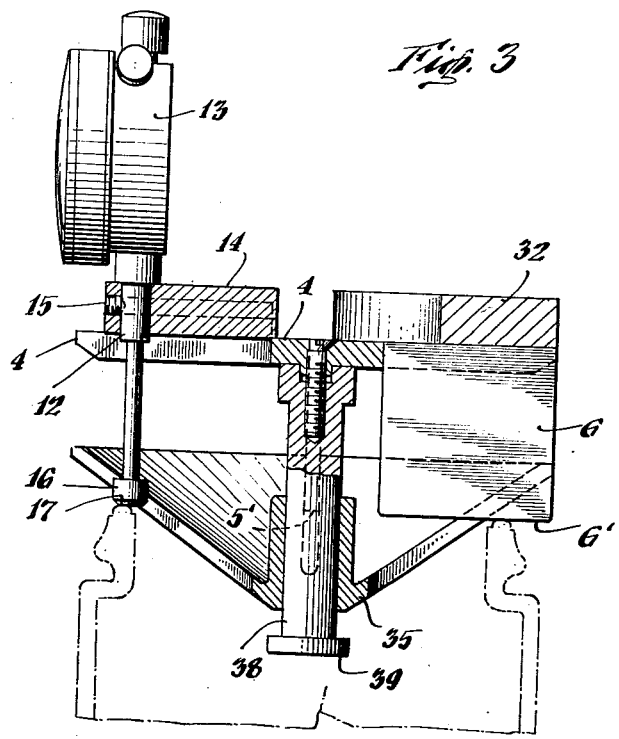
Fig. 3 is a vertical sectional view showing the device of the present invention in use on the rim of a glass container.
Figure 4:
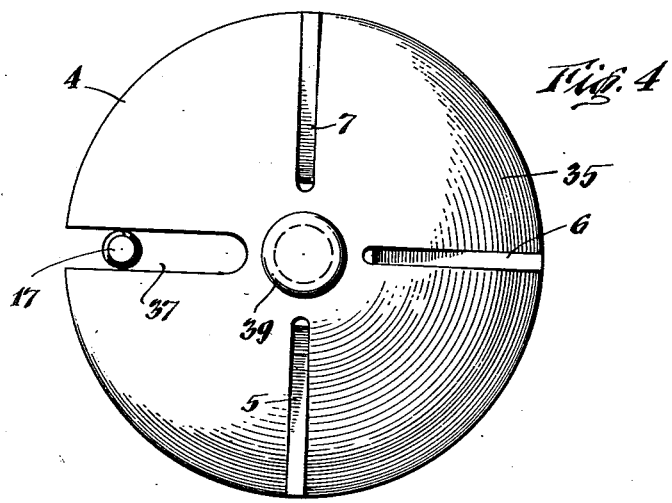
Fig. 4 is a bottom view of the device shown in Figs. 1-3.

As shown, the device comprises support means 4, such as a steel plate, from which project a plurality of angularly spaced steel legs 5, 6 and 7, having elongated lowermost edges 5', 6' and 7', respectively. The legs are shown spaced 90° from each other and the elongated lowermost edges lie in the same plane. By this construction the legs 5 and 7 are diametrically opposite each other, and the other leg 6 is midway between them. The depending legs are preferably made from steel plates and have their edges suitably hardened and ground. In usage the lowermost elongated edges may rest against the uppermost rims of containers. The elongated edges are adapted to rest against container rims of different diameters, for example, they may be of sufficient length to rest against containers of diameters varying from about 38 millimeters to about 89 millimeters.

The support member 4 is shown provided with a slot 10, opposite the middle leg 6 and in line with it, adapted to receive the depending portion 12 of dial gauge 13 located above the supporting member 4. The dial gauge 13 has a portion extending through an adjustable mounting member 14 and is preferably secured to the mounting member by a set screw 15. The mounting member 14 has outwardly projecting flanges 20 and 21 and is held down against the upper surface of the support member 4 by L-shaped retaining members 23 and 24. One of the retaining members (20) may be fixedly secured to the support member 4 by set screws 25. The other retaining member 24 is preferably free to move toward and away from the support member 4, being guided by pins 28 that are fixedly secured to the retaining member 24 and project into suitable openings in the upper surface of the support member, a clamp screw 30 extends through this retaining member 24 and threadedly engages with the support member 4. When the clamp screw 30 is loosened, the grip of the retaining member 24 on the adjustable mounting member is released and latter member may be moved radially with the gauge 13 to shift the position of its depending portion 12 so as to place its foot 16 in alignment of a container rim. When thus adjusted the clamp screw may be tightened to pull the retaining member 24 down against the flange 21 of the mounting member 14 to thereby securely hold the dial gauge and its depending portion in set position.

Any suitable type of dial gauge may be utilized, preferably one calibrated in thousandths of an inch. When the gauge is set to zero reading the lowermost surface 17 of its "foot" lies in the same plane as the bottom edges of the depending legs 5, 6 and 7. Hence when the lower edges of the legs rest against a container rim portion which lies in a single plane, any movement of the dial gauge foot up or down to contact another portion of the container rim will indicate the distance that such a high or low rim portion varies from the single plane in which the legs are supported.

A curved counterweight 32 is preferably bolted to the upper surfaces of the support member 4 opposite the dial gauge to balance the weight of the dial gauge and its mounting and retaining members.

To assist in accurately positioning the device on a container there is provided a centering cone 35 which has its largest diameter adjacent the underside of the support means 4 and its smallest diameter spaced downwardly therefrom. The centering cone is slotted at portions corresponding to the depending legs 5, 6 and 7 so that it may move up and down along those legs. In addition, the cone is preferably provided with a slot 37 through which the depending portion 12 of the dial gauge may project. A rod member 38, having a projecting portion 39 at its lower end, is secured to the support means 4 and holds the centering cone assembled with the other portions of the device.

In checking a container a preliminary test may be made by placing a true surface plate against the upper rim of the container to see if all portions lie in the same plane; if so, the container is satisfactory. If the surface plate indicates that the container has a low portion (Fig. 5), the present device may be placed against the rim so that the lower edges of its legs 5, 6 and 7 lie against a true plane portion of the rim; the lowermost end 17 of the dial gauge foot 16 will then actuate the gauge 13 to indicate the amount by which a depressed portion 41 of the rim lies below the true plane.

If the legs 5, 6, 7 are placed against a low true plane portion of a container rim (Fig. 6) the lowermost end 17 of the dial gauge foot 16 will actuate the gauge mechanism to indicate the elevation of a high portion 42 of the rim above the low true plane portion.

The preliminary test with a surface plate is not essential. The coplanar lower edges of the legs may be placed against a container rim and the container rotated. During rotation the dial gauge may be observed to note whether there are any high or low spots, as well as the distance that they are above or below the lower edges of the legs and the part of the rim which supports them.

If a container rim is what is known as a "rocker," with two high points and two low points, the device may be positioned on the rim as indicated in Fig. 7. In this relationship the two diametrically opposite legs 5 and 7 rest at their lowermost edges against the high portions and the intermediate leg rests against an intermediate low point; due to the inclination of the device the lower end of the dial gauge foot does not indicate the difference in elevation between the high points and the low portions, but the reading on the dial from zero must be divided by two in order to determine the amount that the low portions differ in elevation from the high portions.

It will be seen that the present invention provides a new and improved device for accurately indicating the extent of irregularities which may be present in container rims. The device is relatively simple and compact so that it may be conveniently transported for usage at any location in a manufacturing or packing plant. The device is rugged in construction and well adapted to withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a device of the class described, the combination of support means, a plurality of legs carried by and depending from said support means and angularly spaced from each other having elongated lower surfaces adapted to rest against an upper edge of a container, guide means carried by and depending from said support means to movably retain a conical member, a conical member carried by said guide means and movable along the guide means and legs adapted to center the device upon the container, and said support means having an opening for receiving a portion of a gauge and facilitating movement thereof to align with the upper edge of the container.

2. A device as claimed in claim 1, in which said conical member has a large diameter portion adjacent the support means and a small diameter portion adjacent said elongated lower surfaces of the legs so that it may extend into the open mouth of a container.

3. In a device of the class described, the combination of support means, a plurality of depending legs carried by said support means and angularly spaced from each other having elongated lower surfaces adapted to rest against an upper edge of a container, guide means carried by and depending from said support means to movably retain a conical member, a conical member carried by said guide means and movable along said guide means and legs adapted to center the device upon the container, said support means having an opening for receiving a portion of a gauge and facilitating movement thereof along the support means to align with the edge of the container, and said conical member having openings therein through which said legs extend and an opening in alignment with said opening of the support means.

4. In a device of the class described, the combination of support means, a plurality of legs depending from said support means at angularly spaced locations having elongated lower surfaces adapted to rest against upper edge portions of a container, a conical member carried by said device having portions disposed alongside at least some of said leg members for directing the conical member during movement thereof, said conical member being movable up and down along said legs for centering the device on a container, and stop means carried by the device for limiting the extent of downward movement of said conical member along said legs.

5. A device as claimed in claim 4, in which said stop means comprises a rod member secured to the support means and extending through the conical member and an enlargement adjacent the lower end of the rod member projecting laterally from the rod member.

6. A device as claimed in claim 1, in which a counterweight is carried by the support means at a location opposite said opening thereof.

7. In a device of the class described, the combination of support means, a plurality of legs depending from said support means and angularly spaced from each other having elongated substantially co-planar lower surfaces adapted to rest against the rims of different diameter containers, said support means having an opening generally opposite and in alignment with one of said legs for receiving a portion of an indicating gauge and facilitating movement thereof to a position adjacent said container rims, and gauge-mounting means slidable along said opening to align said portion of the indicating gauge with container rims.

8. A device as claimed in claim 4, in which said plurality of legs comprises three legs, said conical member has a corresponding number of openings through which said legs extend, and said support means and conical member are provided with mutually aligned openings to receive portions of a gauge and facilitate movement thereof for registry with a container rim.

9. A device as claimed in claim 1, in which said elongated lower surfaces lie substantially in a common plane, and said guide means comprises a rod-like member extending through said conical member and having an enlarged lower end to retain the conical member thereon.

10. A device as claimed in claim 4, in which said stop means is disposed below said elongated surfaces.

11. In a device of the class described, the combination of support means, a plurality of depending legs carried by said support means angularly spaced from each other having elongated substantially co-planar lower surfaces adapted to rest against upper edges of different diameter containers, said support means having an elongated opening for receiving a portion of a gauge and facilitating movement thereof toward inner and outer portions of the support means to align the gauge with the upper edges of the containers, and a centering member mounted for movement normal to the plane of said surfaces and adapted to engage the rims of the containers.

References Cited in the file of this patent

UNITED STATES PATENTS

| Number | Name | Date |
| --- | --- | --- |
| 2,010,144 | Dundon | Aug. 6, 1935 |
| 2,044,067 | Eldridge et al. | June 16, 1936 |
| 2,166,650 | Townsend | July 18, 1939 |
| 2,169,952 | Holmes | Aug. 15, 1939 |
| 2,325,362 | Black | July 27, 1943 |
| 2,448,106 | Mannerbrink et al. | Aug. 31, 1948 |
| 2,495,891 | Davis | Jan. 31, 1950 |